US008919953B1

(12) United States Patent
Ho

(10) Patent No.: US 8,919,953 B1
(45) Date of Patent: Dec. 30, 2014

(54) ACTUATABLE CONTACT LENSES

(75) Inventor: Harvey Ho, Mountain View, CA (US)

(73) Assignee: Google Inc., Mountain View, CA (US)

(*) Notice: Subject to any disclaimer, the term of this patent is extended or adjusted under 35 U.S.C. 154(b) by 6 days.

(21) Appl. No.: 13/564,831

(22) Filed: Aug. 2, 2012

(51) Int. Cl.
*G02C 7/04* (2006.01)
*G02C 7/02* (2006.01)

(52) U.S. Cl.
CPC ............... *G02C 7/049* (2013.01); *G02C 7/024* (2013.01)
USPC .................................................... 351/159.03

(58) Field of Classification Search
CPC ............ G02C 7/00; G02C 7/02; G02C 7/022; G02C 7/04; G02C 7/049; G02C 7/024
USPC ........................... 351/159.03, 159.34, 159.39
See application file for complete search history.

(56) References Cited

U.S. PATENT DOCUMENTS

| | | | |
|---|---|---|---|
| 3,958,560 A | 5/1976 | March | |
| 4,014,321 A | 3/1977 | March | |
| 4,055,378 A | 10/1977 | Feneberg et al. | |
| 4,122,942 A | 10/1978 | Wolfson | |
| 4,136,250 A | 1/1979 | Mueller et al. | |
| 4,143,949 A | 3/1979 | Chen | |
| 4,153,641 A | 5/1979 | Deichert et al. | |
| 4,214,014 A | 7/1980 | Hofer et al. | |
| 4,309,085 A | 1/1982 | Morrison | |
| 4,312,575 A | 1/1982 | Peyman et al. | |
| 4,401,371 A | 8/1983 | Neefe | |
| 4,418,990 A | 12/1983 | Gerber | |
| 4,463,149 A | 7/1984 | Ellis | |
| 4,555,372 A | 11/1985 | Kunzler et al. | |
| 4,604,479 A | 8/1986 | Ellis | |
| 4,632,844 A | 12/1986 | Yanagihara et al. | |
| 4,666,445 A | 5/1987 | Tillay | |
| 4,686,267 A | 8/1987 | Ellis et al. | |
| 4,740,533 A | 4/1988 | Su et al. | |
| 4,826,936 A | 5/1989 | Ellis | |
| 4,996,275 A | 2/1991 | Ellis et al. | |
| 4,997,770 A | 3/1991 | Giles et al. | |
| 5,032,658 A | 7/1991 | Baron et al. | |
| 5,034,461 A | 7/1991 | Lai et al. | |
| 5,070,215 A | 12/1991 | Bambury et al. | |
| 5,108,169 A | 4/1992 | Mandell | |
| 5,135,297 A | 8/1992 | Valint et al. | |
| 5,177,165 A | 1/1993 | Valint et al. | |
| 5,177,168 A | 1/1993 | Baron et al. | |
| 5,219,965 A | 6/1993 | Valint et al. | |
| 5,260,000 A | 11/1993 | Nandu et al. | |
| 5,271,875 A | 12/1993 | Appleton et al. | |
| 5,310,779 A | 5/1994 | Lai | |
| 5,321,108 A | 6/1994 | Kunzler et al. | |
| 5,326,584 A | 7/1994 | Kamel et al. | |
| 5,336,797 A | 8/1994 | McGee et al. | |
| 5,346,976 A | 9/1994 | Ellis et al. | |
| 5,358,995 A | 10/1994 | Lai et al. | |
| 5,364,918 A | 11/1994 | Valint et al. | |
| 5,387,662 A | 2/1995 | Kunzler et al. | |
| 5,449,729 A | 9/1995 | Lai | |
| 5,472,436 A | 12/1995 | Fremstad | |
| 5,512,205 A | 4/1996 | Lai | |
| 5,585,871 A | 12/1996 | Linden | |
| 5,610,252 A | 3/1997 | Bambury et al. | |
| 5,616,757 A | 4/1997 | Bambury et al. | |
| 5,682,210 A | 10/1997 | Weirich | |
| 5,708,094 A | 1/1998 | Lai et al. | |
| 5,710,302 A | 1/1998 | Kunzler et al. | |
| 5,714,557 A | 2/1998 | Kunzler et al. | |
| 5,726,733 A | 3/1998 | Lai et al. | |
| 5,760,100 A | 6/1998 | Nicholson et al. | |
| 5,908,906 A | 6/1999 | Kunzler et al. | |
| 5,981,669 A | 11/1999 | Valint et al. | |
| 6,087,941 A | 7/2000 | Ferraz | |
| 6,131,580 A | 10/2000 | Ratner et al. | |
| 6,193,369 B1 | 2/2001 | Valint et al. | |

(Continued)

FOREIGN PATENT DOCUMENTS

| EP | 0369942 | 5/1990 |
|---|---|---|
| EP | 686372 | 12/1995 |

(Continued)

OTHER PUBLICATIONS

Badugu et al., "A Glucose Sensing Contact Lens: A Non-Invasive Technique for Continuous Physiological Glucose Monitoring," Journal of Fluorescence, Sep. 2003, pp. 371-374, vol. 13, No. 5.
Carlson et al., "A 20 mV Input Boost Converter With Efficient Digital Control for Thermoelectric Energy Harvesting,"IEEE Journal of Solid-State Circuits, Apr. 2010, pp. 741-750, vol. 45, No. 4.
Chu et al., "Biomedical soft contact-lens sensor for in situ ocular biomonitoring of tear contents," Biomed Microdevices, 2011, pp. 603-611, vol. 13.
Chu et al., "Soft contact lens biosensor for in situ monitoring of tear glucose as non-invasive blood sugar assessment," Talanta, 2011, pp. 960-965, vol. 83.
"Contact Lenses: Look Into My Eyes," The Economist, Jun. 2, 2011 , http://www.economist.com/node/18750624/print, Last accessed Mar. 13, 2012, 8 pages.

(Continued)

Primary Examiner — Darryl J Collins
(74) Attorney, Agent, or Firm — McDonnell Boehnen Hulbert & Berghoff LLP

(57) ABSTRACT

Apparatus, systems and methods for facilitating actuatable contact lenses are provided. In one aspect, the contact lens can include: a substrate comprised of a material that is actuatable to at least one of change a base curvature from a first curvature to a second curvature or change a thickness from a first thickness to a second thickness; and a control component, operably coupled to the material, that outputs actuation information to cause the material to actuate and at least one of change the base curvature of the material or change the thickness of the material. The contact lens can be actuated based on a condition associated with an environment surrounding the contact lens, a sensed prescription for an eye over which the contact lens is placed or based on a focal point of the eye. The material can include piezoelectric film, a shape memory alloy, hydrogel and/or silicone elastomer.

28 Claims, 9 Drawing Sheets

(56) References Cited

U.S. PATENT DOCUMENTS

| | | |
|---|---|---|
| 6,200,626 B1 | 3/2001 | Grobe et al. |
| 6,213,604 B1 | 4/2001 | Valint et al. |
| 6,312,393 B1 | 11/2001 | Abreu |
| 6,348,507 B1 | 2/2002 | Heiler et al. |
| 6,366,794 B1 | 4/2002 | Moussy et al. |
| 6,423,001 B1 | 7/2002 | Abreu |
| 6,428,839 B1 | 8/2002 | Kunzler et al. |
| 6,431,705 B1 | 8/2002 | Linden |
| 6,440,571 B1 | 8/2002 | Valint et al. |
| 6,450,642 B1 | 9/2002 | Jethmalani et al. |
| 6,532,298 B1 | 3/2003 | Cambier et al. |
| 6,550,915 B1 | 4/2003 | Grobe, III |
| 6,570,386 B2 | 5/2003 | Goldstein |
| 6,579,235 B1 | 6/2003 | Abita et al. |
| 6,599,559 B1 | 7/2003 | McGee et al. |
| 6,614,408 B1 | 9/2003 | Mann |
| 6,630,243 B2 | 10/2003 | Valint et al. |
| 6,638,563 B2 | 10/2003 | McGee et al. |
| 6,726,322 B2 | 4/2004 | Andino et al. |
| 6,735,328 B1 | 5/2004 | Helbing et al. |
| 6,779,888 B2 | 8/2004 | Marmo |
| 6,804,560 B2 | 10/2004 | Nisch et al. |
| 6,851,805 B2 | 2/2005 | Blum et al. |
| 6,885,818 B2 | 4/2005 | Goldstein |
| 6,939,299 B1 | 9/2005 | Petersen et al. |
| 6,980,842 B2 | 12/2005 | March et al. |
| 7,018,040 B2 | 3/2006 | Blum et al. |
| 7,131,945 B2 | 11/2006 | Fink et al. |
| 7,169,106 B2 | 1/2007 | Fleischman et al. |
| 7,396,126 B2 | 7/2008 | Blum et al. |
| 7,398,119 B2 | 7/2008 | Lambert et al. |
| 7,423,801 B2 | 9/2008 | Kaufman et al. |
| 7,429,465 B2 | 9/2008 | Muller et al. |
| 7,441,892 B2 | 10/2008 | Hsu |
| 7,443,016 B2 | 10/2008 | Tsai et al. |
| 7,450,981 B2 | 11/2008 | Jeon |
| 7,601,274 B2 * | 10/2009 | Mather et al. ............ 252/299.01 |
| 7,639,845 B2 | 12/2009 | Utsunomiya |
| 7,654,671 B2 | 2/2010 | Glynn |
| 7,699,465 B2 | 4/2010 | Dootjes et al. |
| 7,728,949 B2 | 6/2010 | Clarke et al. |
| 7,751,896 B2 | 7/2010 | Graf et al. |
| 7,799,243 B2 | 9/2010 | Mather et al. |
| 7,809,417 B2 | 10/2010 | Abreu |
| 7,878,650 B2 | 2/2011 | Fritsch et al. |
| 7,885,698 B2 | 2/2011 | Feldman |
| 7,907,931 B2 | 3/2011 | Hartigan et al. |
| 7,926,940 B2 | 4/2011 | Blum et al. |
| 7,931,832 B2 | 4/2011 | Pugh et al. |
| 7,964,390 B2 | 6/2011 | Rozakis et al. |
| 8,080,187 B2 | 12/2011 | Tepedino, Jr. et al. |
| 8,096,654 B2 | 1/2012 | Amirparviz et al. |
| 8,118,752 B2 | 2/2012 | Hetling et al. |
| 8,142,016 B2 | 3/2012 | Legerton et al. |
| 8,224,415 B2 | 7/2012 | Budiman |
| 8,292,953 B2 | 10/2012 | Weeber et al. |
| 8,446,341 B2 | 5/2013 | Amirparviz et al. |
| 2002/0193674 A1 | 12/2002 | Fleischman et al. |
| 2003/0179094 A1 | 9/2003 | Abreu |
| 2004/0015261 A1 | 1/2004 | Hofmann et al. |
| 2004/0027536 A1 | 2/2004 | Blum et al. |
| 2004/0116794 A1 | 6/2004 | Fink et al. |
| 2005/0045589 A1 | 3/2005 | Rastogi et al. |
| 2005/0143814 A1 * | 6/2005 | Esch et al. ................... 623/6.22 |
| 2005/0221276 A1 | 10/2005 | Rozakis et al. |
| 2006/0206205 A1 | 9/2006 | Azar |
| 2007/0016074 A1 | 1/2007 | Abreu |
| 2007/0030443 A1 | 2/2007 | Chapoy et al. |
| 2007/0121065 A1 | 5/2007 | Cox et al. |
| 2007/0188710 A1 | 8/2007 | Hetling et al. |
| 2008/0208335 A1 | 8/2008 | Blum et al. |
| 2008/0218696 A1 | 9/2008 | Mir |
| 2009/0033863 A1 | 2/2009 | Blum et al. |
| 2009/0036761 A1 | 2/2009 | Abreu |
| 2009/0057164 A1 | 3/2009 | Minick et al. |
| 2009/0076367 A1 | 3/2009 | Sit et al. |
| 2009/0118604 A1 | 5/2009 | Phan et al. |
| 2009/0189830 A1 | 7/2009 | Deering et al. |
| 2009/0196460 A1 | 8/2009 | Jakobs et al. |
| 2010/0001926 A1 | 1/2010 | Amirparviz et al. |
| 2010/0013114 A1 | 1/2010 | Bowers et al. |
| 2010/0016704 A1 | 1/2010 | Naber et al. |
| 2010/0028559 A1 | 2/2010 | Yan et al. |
| 2010/0072643 A1 | 3/2010 | Pugh et al. |
| 2010/0103368 A1 | 4/2010 | Amirparviz et al. |
| 2010/0109175 A1 | 5/2010 | Pugh et al. |
| 2010/0110372 A1 | 5/2010 | Pugh et al. |
| 2010/0113901 A1 | 5/2010 | Zhang et al. |
| 2010/0133510 A1 | 6/2010 | Kim et al. |
| 2010/0249548 A1 | 9/2010 | Muller |
| 2011/0015512 A1 | 1/2011 | Pan et al. |
| 2011/0028807 A1 | 2/2011 | Abreu |
| 2011/0040161 A1 | 2/2011 | Abreu |
| 2011/0055317 A1 | 3/2011 | Vonog et al. |
| 2011/0063568 A1 | 3/2011 | Meng et al. |
| 2011/0084834 A1 | 4/2011 | Sabeta |
| 2011/0116035 A1 | 5/2011 | Fritsch et al. |
| 2011/0157541 A1 | 6/2011 | Peyman |
| 2011/0157544 A1 | 6/2011 | Pugh et al. |
| 2011/0184271 A1 | 7/2011 | Veciana et al. |
| 2011/0213462 A1 | 9/2011 | Holladay |
| 2011/0274680 A1 | 11/2011 | Mazed et al. |
| 2011/0286064 A1 | 11/2011 | Burles et al. |
| 2011/0298794 A1 | 12/2011 | Freedman |
| 2012/0026458 A1 | 2/2012 | Qiu et al. |
| 2012/0038881 A1 | 2/2012 | Amirparviz et al. |
| 2012/0041287 A1 | 2/2012 | Goodall et al. |
| 2012/0041552 A1 | 2/2012 | Chuck et al. |
| 2012/0069254 A1 | 3/2012 | Burton |
| 2012/0075168 A1 | 3/2012 | Osterhout et al. |
| 2012/0075574 A1 | 3/2012 | Pugh et al. |
| 2012/0078071 A1 | 3/2012 | Bohm et al. |
| 2012/0088258 A1 | 4/2012 | Bishop et al. |
| 2012/0092612 A1 | 4/2012 | Binder |
| 2012/0109296 A1 | 5/2012 | Fan |
| 2012/0140167 A1 * | 6/2012 | Blum ...................... 351/159.34 |
| 2012/0177576 A1 | 7/2012 | Hu |
| 2012/0201755 A1 | 8/2012 | Rozakis et al. |
| 2012/0206691 A1 | 8/2012 | Iwai |
| 2012/0245444 A1 | 9/2012 | Otis et al. |
| 2012/0259188 A1 | 10/2012 | Besling |
| 2013/0128221 A1 | 5/2013 | Otts et al. |
| 2013/0242255 A1 | 9/2013 | Caldarise et al. |

FOREIGN PATENT DOCUMENTS

| | | |
|---|---|---|
| EP | 1061874 | 12/2000 |
| EP | 1617757 | 1/2006 |
| EP | 1818008 | 8/2007 |
| EP | 1947501 | 7/2008 |
| EP | 2457122 | 5/2012 |
| GB | 2487477 A * | 7/2012 |
| WO | 95/04609 | 2/1995 |
| WO | 0116641 | 3/2001 |
| WO | 01/34312 | 5/2001 |
| WO | 03065876 | 8/2003 |
| WO | 2004/060431 | 7/2004 |
| WO | 2004064629 | 8/2004 |
| WO | 2006015315 | 2/2006 |
| WO | 2009094643 | 7/2010 |
| WO | 2010105728 | 9/2010 |
| WO | 2010133317 | 11/2010 |
| WO | 2010133317 A9 | 11/2010 |
| WO | 2011/011344 | 1/2011 |
| WO | 2011034592 | 3/2011 |
| WO | 2011035228 | 3/2011 |
| WO | 2011035262 | 3/2011 |
| WO | 2011083105 | 7/2011 |
| WO | 2011163080 | 12/2011 |
| WO | 2012035429 | 3/2012 |
| WO | 2012037455 | 3/2012 |
| WO | 2012051167 | 4/2012 |

(56) References Cited

FOREIGN PATENT DOCUMENTS

| WO | 2012051223 | 4/2012 |
|---|---|---|
| WO | 2012052765 | 4/2012 |

OTHER PUBLICATIONS

Ho et al., "Contact Lens With Integrated Inorganic Semiconductor Devices," MEMS 2008. IEEE 21st International Conference on. IEEE, 2008., pp. 403-406.

Holloway, "Microsoft developing electronic contact lens to monitor blood sugar," Gizmag, Jan. 5, 2012, http://www.gizmag.com/microsoft-electronic-diabetic-contact-lens/20987/, Last accessed Mar. 13, 2012. 5 pages.

Lähdesmäki et al., "Possibilities for Continuous Glucose Monitoring by a Functional Contact Lens," IEEE Instrumentation & Measurement Magazine, Jun. 2010, pp. 14-17.

Lingley et al., "A contact lens with integrated micro solar cells," Microsyst Technol, 2012, pp. 453-458, vol. 18.

Parviz, Babak A., "For Your Eyes Only," IEEE Spectrum, Sep. 2009, pp. 36-41.

Saeedi, E. et al., "Self-assembled crystalline semiconductor optoelectronics on glass and plastic," J. Micromech. Microeng., 2008, pp. 1-7, vol. 18.

Saeedi et al., "Self-Assembled Inorganic Micro-Display on Plastic," Micro Electro Mechanical Systems, 2007. MEMS. IEEE 20th International Conference on. IEEE, 2007., pp. 755-758.

Sensimed Triggerfish, Sensimed Brochure, 2010, 10 pages.

Shih, Yi-Chun et al., "An Inductorless DC-DC Converter for Energy Harvesting With a 1.2-μW Bandgap-Referenced Output Controller," IEEE Transactions on Circuits and Systems—II: Express Briefs, Dec. 2011, pp. 832-836, vol. 58, No. 12.

Shum et al., "Functional modular contact lens," Proc. of SPIE, 2009, pp. 73970K-1 to 73970K-8, vol. 7397.

Stauth et al., "Self-assembled single-crystal silicon circuits on plastic," PNAS, Sep. 19, 2006, pp. 13922-13927, vol. 103, No. 38.

Yao, H. et al., "A contact lens with integrated telecommunication circuit and sensors for wireless and continuous tear glucose monitoring," J. Micromech. Microeng., 2012, pp. 1-10, vol. 22.

Yao, H. et al., "A Dual Microscal Glucose Sensor on a Contact Lens, Tested in Conditions Mimicking the Eye," Micro Electro Mechanical Systems (MEMS), 2011 IEEE 24th International Conference on. IEEE, 2011, pp. 25-28.

Yao et al., "A contact lens with embedded sensor for monitoring tear glucose level," Biosensors and Bioelectronics, 2011, pp. 3290-3296, vol. 26.

Yao, H. et al., "A Soft Hydrogel Contact Lens with an Encapsulated Sensor for Tear Glucose Monitoring," Micro Electro Mechanical Systems (MEMS), 2012 IEEE 25th International Conference on. IEEE, 2012, pp. 769-772.

Yeager et al., "A 9 μA, Addressable Gen2 Sensor Tag for Biosignal Acquistion," IEEE Journal of Solid-State Circuits, Oct. 2010, pp. 2198-2209, vol. 45, No. 10.

Zhang et al., "Design for Ultra-Low Power Biopotential Amplifiers for Biosignal Acquistion Applications," IEEE Transactions on Biomedical Circuits and Systems, 2012, pp. 344-355, vol. 6, No. 4.

Wall, K., "Active contact lens that lets you see like the Terminator patented," Feb. 10, 2012, http://www.patexia.com/feed/active-contact-lens-that-lets-you-see-like-the-terminator-patented-2407, Last accessed Mar. 28, 2012, 5 pages.

Parviz, Babak A., "Augmented Reality in a Contact Lens," IEEE Spectrum, Sep. 2009, http://spectrum.ieee.org/biomedical/bionics/augmented-reality-in-a-contact-lens/0, Last accessed Mar. 14, 2012, 6 pages.

Bionic contact lens 'to project emails before eyes,' http://www.kurzweilai.net/forums/topic/bionic-contact-lens-to-project-emails-before-eyes, Last accessed Mar. 14, 2012, 2 pages.

Tweedie, et al., "Contact creep compliance of viscoelastic materials via nanoindentation," J. Mater. Res., Jun. 2006, vol. 21, No. 2, pp. 1576-1589, Materials Research Society.

Brahim, et al., "Polypyrrole-hydrogel composites for the construction of clinically important biosensors," 2002, Biosensors & Bioelectronics, vol. 17, pp. 53-59.

Huang, et al., "Wrinkling of Ultrathin Polymer Films," Mater. Res. Soc. Symp. Proc., 2006, vol. 924, 6 pages, Materials Research Society.

Zarbin, et al., "Nanotechnology in ophthalmology," Can J Ophthalmol, 2010, vol. 45, No. 5, pp. 457-476.

Selner, et al., "Novel Contact Lens Electrode Array for Multi-electrode Electroretinography (meERG)," IEEE, 2011, 2 pages.

Liao, et al., "A 3-μW CMOS Glucose Sensor for Wireless Contact-Lens Tear Glucose Monitoring," IEEE Journal of Solid-State Circuits, Jan. 2012, vol. 47, No. 1, pp. 335-344.

Chen, et al., "Microfabricated Implantable Parylene-Based Wireless Passive Intraocular Pressure Sensors," Journal of Microelectromechanical Systems, Dec. 2008, vol. 17, No. 6, pp. 1342-1351.

Thomas, et al., "Functional Contact Lenses for Remote Health Monitoring in Developing Countries," IEEE Global Humanitarian Technology Conference, 2011, pp. 212-217, IEEE Computer Society.

Pandey, et al., "A Fully Integrated RF-Powered Contact Lens With a Single Element Display," IEEE Transactions on Biomedical Circuits and Systems, Dec. 2010, vol. 4, No. 6, pages.

Lingley, et al., "Multipurpose integrated active contact lenses," SPIE, 2009, 2 pages.

Chu, et al., "Soft Contact-lens Sensor for Monitoring Tear Sugar as Novel Wearable Device of Body Sensor Network," http://www.ksi.edu/seke/dms11/DMS/2_Kohji.Mitsubayashi.pdf, Last accessed Jul. 27, 2012, 4 pages.

Liao, et al., "A 3μW Wirelessly Powered CMOS Glucose Sensor for an Active Contact Lens," 2011 IEEE International Solid-State Circuits Conference, Session 2, Feb. 21, 2011, 3 pages.

Hurst, "How contact lenses could help save your life," Mail Online, Apr. 19, 2010, http://www.dailymail.co.uk/health/article-1267345/How-contact-lenses-help-save-life.html, Last accessed Jul. 27, 2012.

Lončar, et al., "Design and Fabrication of Silicon Photonic Crystal Optical Waveguides," Journal of Lightwave Technology, Oct. 2000, vol. 18, No. 10, pp. 1402-1411.

Baxter, "Capacitive Sensors," 2000, 17 pages.

Lingley, et al., "A Single-Pixel Wireless Contact Lens Display," Journal of Micromechanics and Microengineering, 2011, 9 pages.

"Polyvinylidene fluoride," Wikipedia, http://en.wikipedia.org/wiki/Polyvinylidene_fluoride, Last accessed Mar. 30, 2012, 4 pages.

Murdan, "Electro-responsive drug delivery from hydrogels," Journal of Controlled Release, 2003, vol. 92, pp. 1-17.

Haders, "New Controlled Release Technologies Broaden Opportunities for Ophthalmic Therapies," Drug Delivery Technology, Jul./Aug. 2009, vol. 8, No. 7, pp. 48-53.

Singh, et al., "Novel Approaches in Formulation and Drug Delivery using Contact Lenses," Journal of Basic and Clinical Pharmacy, May 2011, vol. 2, Issue 2, pp. 87-101.

Liu, et al., "Miniature Amperometric Self-Powered Continuous Glucose Sensor with Linear Response," Analytical Chemistry, 2012, 7 pages.

Son, Hyung-Min et al., "New Variable Focal Liquid Lens System Using Antagonistic-type SMA Actuator," Proceedings of the 4th International Conference on Autonomous Robots and Agents, Feb. 10-12, 2009, Wellington, New Zealand, pp. 476-479. IEEE Explore.

\* cited by examiner

ACTUATABLE CONTACT LENSES

TECHNICAL FIELD

This disclosure generally relates to actuatable contact lenses.

BACKGROUND

Corneal molding is a non-surgical process that reshapes the cornea of the eye using special contact lenses, sometimes known as corneal molds or retainers. Conventional corneal mold/retainer contact lenses are specially prescribed for an individual to mold to the eye of the individual and are worn overnight and taken out during the day. As the eye relaxes over the course of the day, the wearer of the corneal mold/retainer contact lens must place the contact lenses back into his/her eye to re-mold the eyes. This process can be inconvenient and unpredictable, for example, if the individual has a short night (e.g., getting up early) or a long day (e.g., staying up late).

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its purpose is to present some concepts of one or more aspects in a simplified form as a prelude to the more detailed description that is presented later.

In one or more aspects, the disclosed subject matter relates to a contact lens that includes a substrate that includes a material adapted to actuate and form a first one of a plurality of base curvatures at a first time and a second one of the plurality of base curvatures at a second time.

In one or more aspects, the disclosed subject matter relates to a contact lens that includes a substrate that includes a material adapted to actuate and change a thickness of the material from a first thickness at a first time to a second thickness at a second time.

In one or more aspects, the disclosed subject matter relates to a contact lens that can include: a substrate having a material that is actuatable to at least one of change a base curvature of the material from a first curvature to a second curvature or change a thickness of the material from a first thickness to a second thickness; and a control component, operably coupled to the material, that outputs actuation information to cause the material to actuate and at least one of change the base curvature of the material or change the thickness of the material.

In one or more aspects, the disclosed subject matter relates to a method of actuating a contact lens. The method can include: receiving actuation information indicative of at least one of a base curvature of a contact lens or a thickness of a material of the contact lens; and actuating the contact lens by at least one of changing the base curvature or changing the thickness of the substrate based, at least, on the receiving the information.

In one or more aspects, the disclosed subject matter relates to a contact lens that includes: a substrate having a material adapted to actuate and change a hydration level of the material from a first hydration level at a first time to a second hydration level at a second time; and a control component, operably coupled to the material, that generates an electric field to cause the material to actuate and change the hydration level of the material.

Toward the accomplishment of the foregoing and related ends, the one or more aspects include the features hereinafter fully described and particularly pointed out in the claims. The following description and the annexed drawings set forth herein detail certain illustrative aspects of the one or more aspects. These aspects are indicative, however, of but a few of the various ways in which the principles of various aspects can be employed, and the described aspects are intended to include all such aspects and their equivalents.

DETAILED DESCRIPTION

Figure 1:
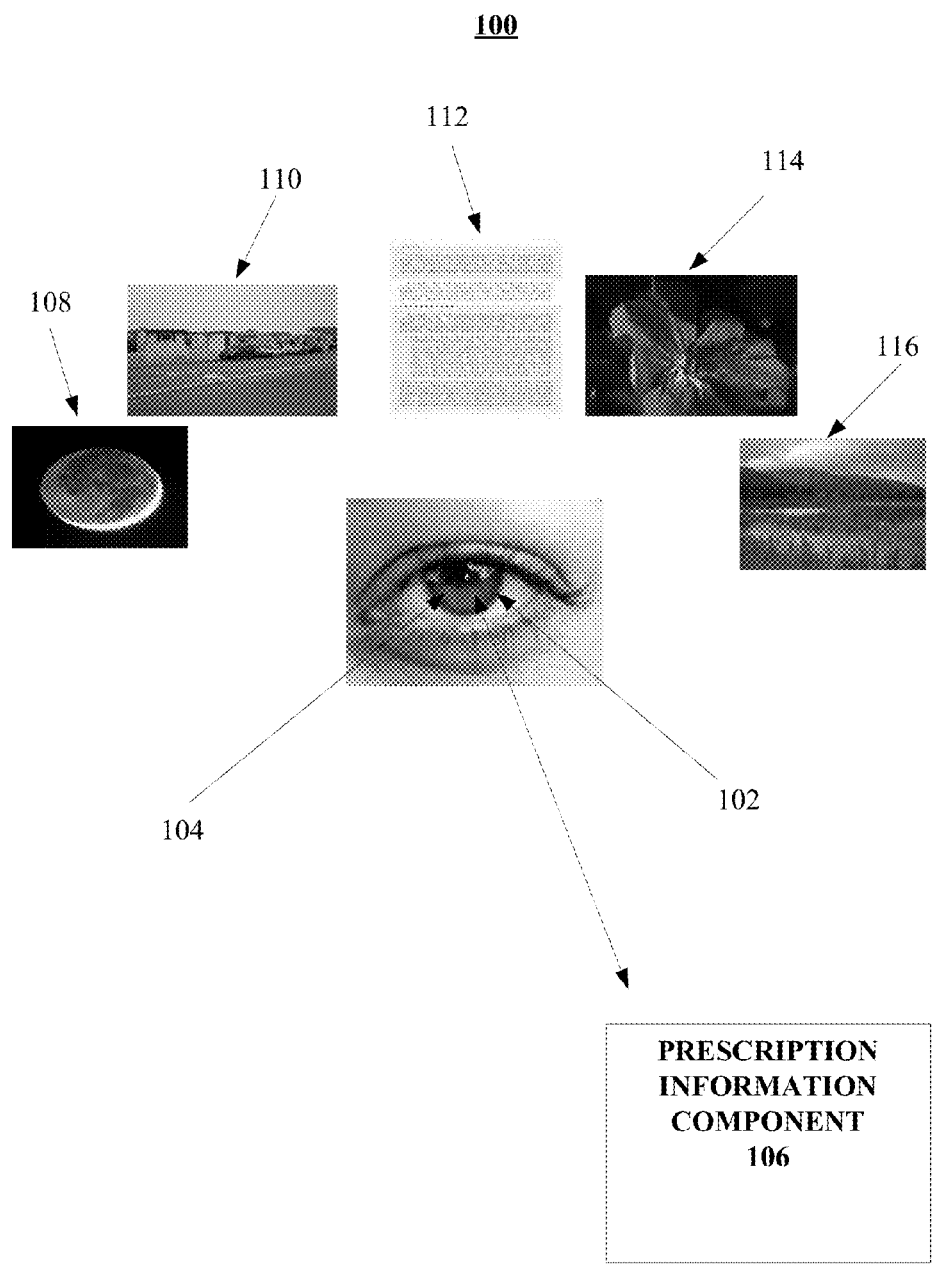
FIG. 1 is an illustration of a diagram of an exemplary non-limiting system in which actuatable contact lenses are facilitated in accordance with aspects described herein.

Various aspects are now described with reference to the drawings, wherein like reference numerals are used to refer to like elements throughout. In the following description, for purposes of explanation, numerous specific details are set forth in order to provide a more thorough understanding of one or more aspects. It is evident, however, that such aspects can be practiced without these specific details. In other instances, structures and devices are shown in block diagram form in order to facilitate describing one or more aspects.

It is to be appreciated that in accordance with one or more aspects described in this disclosure, users can opt-out of providing personal information, demographic information, location information, proprietary information, medical information, sensitive information, or the like in connection with data gathering aspects. Moreover, one or more aspects described herein can provide for anonymizing collected, received, or transmitted data.

Apparatus, systems and methods disclosed herein relate to actuatable contact lenses. In particular, an actuatable contact lens can include a substrate having of a material that is actuatable to change a base curvature of the material from a first curvature to a second curvature or change a thickness of the material from a first thickness to a second thickness. The actuatable contact lens can also include a control component, operably coupled to the material, that outputs actuation information to cause the material to actuate and change the base curvature of the material or change the thickness of the material. In various aspects, the actuatable contact lens can also include a control component that can determine the base curvature and/or thickness to which the contact lens should actuate, and/or output information (e.g., voltage, temperature, electric field) to cause the actuation. In some aspects, temperature can be output from other elements near the contact lens including, but not limited to, the eyelid or air near the eye.

In some aspects, the control component can detect conditions associated with the contact lens (e.g., environment or focal point of an eye over which the contact lens is placed) and adjust the base curvature and/or thickness accordingly.

Accordingly, one or more aspects of the apparatus, systems and/or methods described herein can advantageously facilitate adaptive change of a prescription/strength of a contact lens.

FIG. 1 is an illustration of a block diagram of an exemplary non-limiting system in which actuatable contact lenses are facilitated in accordance with aspects described herein. The system 100 can include an actuatable contact lens 102 formed to cover a portion of an iris 104 of the wearer of the actuatable contact lens 102. The actuatable contact lens 102 can actuate to change the base curvature and/or thickness of the actuatable contact lens 102.

In various aspects, the actuatable contact lens 102 can detect or otherwise obtain one or more environmental conditions surrounding the actuatable contact lens 102 (e.g., the presence of sun or moon 108, nighttime or daytime), focal points of the eye over which the actuatable contact lens 102 is placed (e.g., highway 110, page of a book 112, flower 114 and/or landscape 116). The actuatable contact lens 102 can dynamically adjust the base curvature and/or the thickness of the contact lens based on the detected conditions in various aspects.

In some aspects, the system 100 can also include a prescription information component 106 adapted to transmit and/or receive information to and/or from the actuatable contact lens 102 to change the base curvature and/or thickness of the contact lens. The actuatable contact lens 102 can adjust the base curvature and/or thickness based on the information from the prescription information component 106.

Figure 2A:
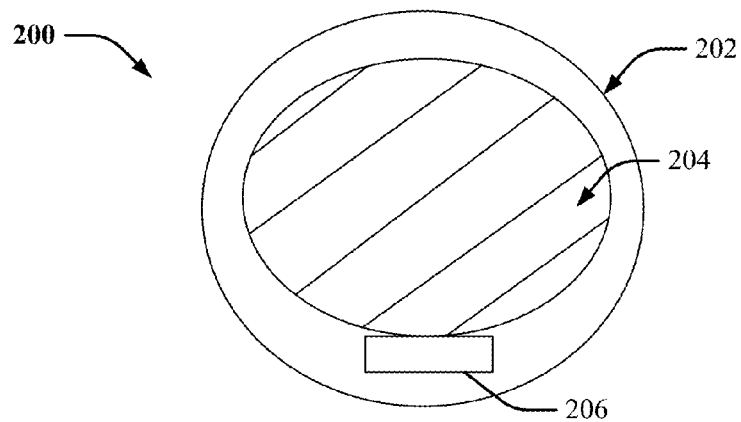
FIGS. 2A, 2B and 2C are illustrations of diagrams of exemplary non-limiting actuatable contact lenses in accordance with aspects described herein.
Figure 2B:
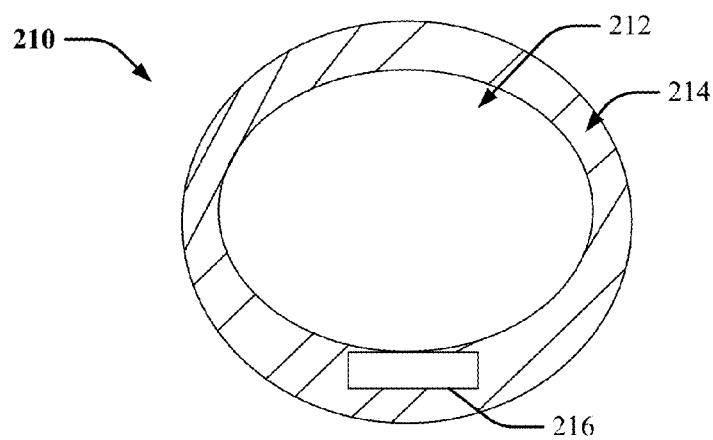
Figure 2C:
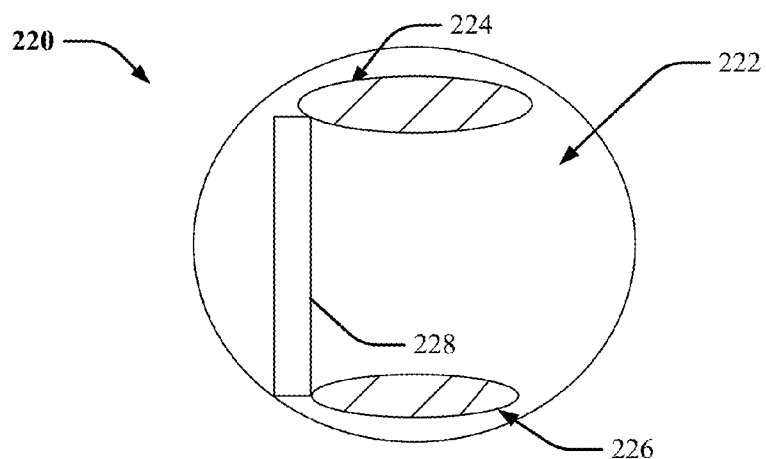
Figure 3A:
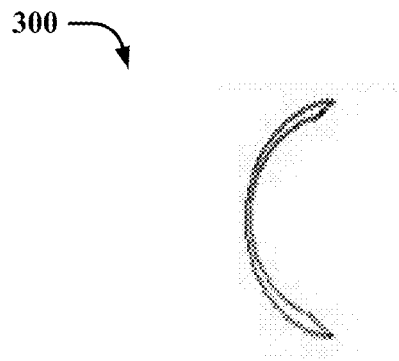
FIGS. 3A and 3B are illustrations of diagrams of exemplary non-limiting actuatable contact lenses having different base curvatures in accordance with aspects described herein.
Figure 3B:
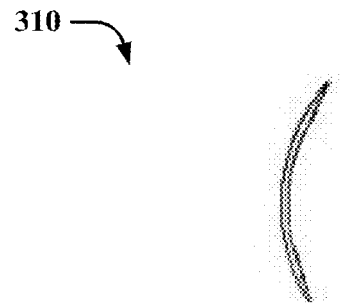
Figure 3C:
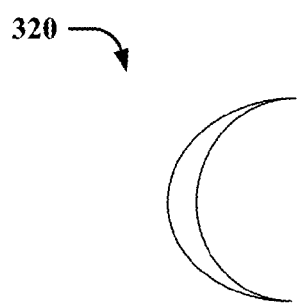
FIGS. 3C and 3D are illustrations of diagrams of exemplary non-limiting actuatable contact lenses having different thicknesses in accordance with aspects described herein.
Figure 3D:
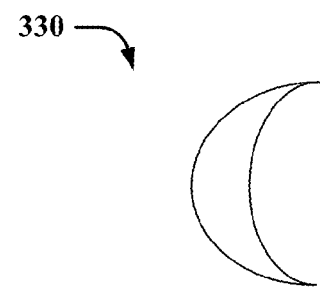

Various aspects of the actuatable contact lens will be described with reference to FIGS. 2A, 2B, 2C, 3A, 3B, 3C and 3D. FIGS. 2A, 2B and 2C are illustrations of diagrams of exemplary non-limiting actuatable contact lenses in accordance with aspects described herein. FIGS. 3A and 3B are illustrations of diagrams of exemplary non-limiting actuatable contact lenses having different base curvatures in accordance with aspects described herein. FIGS. 3C and 3D are illustrations of diagrams of exemplary non-limiting actuatable contact lenses having different thicknesses in accordance with aspects described herein.

Turning first to FIG. 2A, the contact lens 200 can include a substrate 202 and a material 204 disposed on, integrated with and/or coupled to the substrate. The contact lens 200 can also include a control component 206 in some aspects. The control component 206 can be electrically coupled to the material 204 and/or the substrate 202 in various aspects. In some aspects, one or more of the substrate 202, material 204 and/or control component 206 (or components thereof) can be fabricated through multi-stage injection molding to join such dissimilar materials to one another.

In various aspects, the substrate 202 can be transparent and/or translucent. In various aspects, the substrate is formed to cover at least a portion of the eye.

In some aspects, the material 204 can be disposed on one or more portions of the substrate 202. In various aspects, the material 204 can be disposed on an inner surface of the substrate 202 against an eye of the wearer of the contact lens 200 and/or disposed on an outer surface of the substrate 202.

FIGS. 2B and 2C illustrate contact lens 210 and 220, respectively. As shown in FIGS. 2B and 2C, the material 214, 224, 226, substrate 212, 222 and/or control component 216, 228 can be in various configurations. For example, while FIG. 2A illustrates a configuration in which the material 204 is provided in/under/over an inner region of the contact lens, FIG. 2B illustrates a configuration in which the material 214 is provided in/under/over/around an outer region of the contact lens 210 and FIG. 2C illustrates a configuration in which the material 224, 226 is provided as separate elements located, for example, along an outer region of the contact lens 220. Accordingly, the material can be contiguous, non-contiguous, any number of different shapes, located on an inner surface of the contact lens or an outer surface of the contact lens or the like. All such aspects are envisaged. In some aspects, as with FIG. 2A, one or more of the elements/components of FIGS. 2B and/or 2C can be fabricated through multi-stage injection molding to join such dissimilar materials to one another.

With reference to FIGS. 2A, 2B, 2C, 3A and 3B, in various aspects, the material 204 can be adapted to mold the eye of the wearer by actuating to the different base curvatures and/or thicknesses. For example, the material 204 can actuate and cause the contact lens to form different base curvatures at different points in time. For example, the material 204 can actuate to cause the contact lens to form a first base curvature (e.g., the base curvature 310 shown at FIG. 3A) at a first time and a second base curvature (e.g., the base curvature 310 shown at FIG. 3B) at a second time. As such, the contact lens 200 can change base curvature based on the actuation of the material 204. In various aspects, the base curvature of a contact lens can be the radius of the sphere of the side of the contact lens that contacts the eye.

In various aspects, the material 204 can be adapted to actuate and change to one of a plurality of different thicknesses based on a temperature experienced by the material. For example, the material 204 can actuate and become thinner, causing the material to have a first thickness (e.g., the thickness 320 shown at FIG. 3C). As another example, the material 204 can actuate and become thicker, causing the material to have a second thickness (e.g., the thickness 330 shown at FIG. 3D). In various aspects, different types of material can be provided in/on a single contact lens such that various materials can have different thicknesses concurrently. As such, the contact lens 200 can change thickness based on the actuation of the material(s), e.g., material 204.

In various aspects, the material 204 can be adapted to actuate and change to one of a plurality of different thicknesses based on an electric field or affects of electrowetting experienced by the material. For example, the material 204 can be a hydrogel. The material 204 can actuate and have a first hydration level, causing the material to have a first thickness (resulting in the thickness 320 shown at FIG. 3C). As another example, the material 204 can actuate and have a second hydration level (resulting in the thickness 330 shown at FIG. 3D). In various aspects, different types of material can be provided on a single contact lens such that various materials can have different hydration levels (and corresponding thicknesses) concurrently. As such, the contact lens 200 can change thickness based on the actuation of the material 204.

In various aspects, the material 204 can be adapted to actuate and change base curvature and/or thickness, depending on the information output by the control component 206. In various aspects described herein, the material 204 can be actuated to change base curvature and/or thickness, and/or the material 204 can be actuated to cause the contact lens to change base curvature and/or thickness.

In various aspects, the material 204 can be or can include a shape memory alloy. In various aspects, the shape memory alloy can be one or more different shape memory alloys that are biocompatible. In some aspects, the shape memory alloy can include, but is not limited to, Nitinol (NiTi), Nickel Titanium, Titanium Nitride (TiNi), copper-aluminum-nickel, copper-zinc-aluminum, iron-manganese-silicon, or the like. The shape memory alloy can be adapted to actuate and change base curvature and/or thickness of the contact lens depending on temperature and/or a stress applied to the contact lens generated by a wearer of the contact lens 200. In some embodiments, the stress can be applied to the contact lens by pressure from the eyelid of the eye in which the contact lens is being worn. For example, in aspects wherein the contact lens 200 is worn during sleep, the contact lens 200 can take on a first base curvature and/or thickness based on the temperature generated during sleep and/or the stress (e.g., eyelid pressure) applied to the material 204. Similarly, while the wearer of the contact lens is awake, and the eyes of the contact lens 200 wearer are open, the contact lens 200 can take on a second base curvature and/or thickness based on the temperature generated while awake and/or the stress applied to the material 204. The rate at which the material 204 changes base curvature and/or thickness can be based on the type of the shape memory alloy selected for the contact lens 200. Accordingly, the shape memory alloy can re-shape the eye of the wearer of the contact lens 200 based on the base curvature resultant from the actuation, for example.

When the shape memory alloy experiences a change in temperature, the shape memory alloy can be deformed into another shape and the base curvature and/or thickness of the contact lens 200 can be changed. The shape memory alloy remains in this new shape until the temperature of the shape memory alloy increases above a transition temperature. When the shape memory alloy experiences this change in temperature, the shape memory alloy returns to its original shape, and the original base curvature and/or thickness with which the contact lens 200 was designed, remaining in this state until deformed again. The temperature applied to the shape memory alloy can be controlled by an output from the control component 206. In one aspect, the shape memory alloy of material 204 demonstrates a one-way memory effect. In another aspect, the shape memory alloy of material 204 demonstrates a two-way memory effect.

In various aspects, the material 204 can be or include a piezoelectric film. In various aspects, the piezoelectric film can include, but is not limited to, a piezoelectric ceramic and/or polyvinylidene fluoride (PVDF). Because PVDF has a high degree of translucency, the PVDF can be employed in aspects wherein the material 204 is provided over an area of the contact lens 200 through which the wearer of the contact lens 200 would like to view the environment outside of the contact lens. In some aspects, PVDF and/or another piezoelectric film can be formulated to be substantially optically transparent. In other aspects, thin piezoelectric ceramic material can be employed as the material 204 (when the material 204 is provided over the pupil area through which the wearer of the contact lens must view an environment outside of the contact lens).

The voltage applied to the piezoelectric film to actuate the material can be an output from the control component 206. For example, a particular voltage corresponding to a base curvature and/or thickness (or corresponding to an amount of change in base curvature and/or thickness) can be output from the control component 206.

In various aspects, the voltage can be output based on power generated by the control component 206. The control component 206 can include, but is not limited to, a photovoltaic device and/or a radio frequency (RF) device.

In various aspects, the piezoelectric film can actuate based on voltage received from a source external to the contact lens 200. For example, the source can be an energy source located remote from the contact lens 200, e.g., an RF source, or photovoltaic device, and configured to transmit energy wirelessly to the material 204 of the contact lens 200.

In various aspects, the material 204, 214, 224, 226 can be a hydrogel. An electric field applied to the hydrogel to actuate the material can be an output from the control component 206. For example, a particular strength of an electric field corresponding to a thickness (or corresponding to an amount of a change in thickness) can be output from the control component 206. Accordingly, electrowetting or similar methods, can be employed to change the hydration level (and correspondingly the level of swelling, or thickness) of the material 204, 214, 224, 226.

In other aspects, the material 204, 214, 224, 226 can be any number of different types of material that can swell (thereby changing level of thickness of the material). In some of these aspects, swelling can be initiated from processes other than water uptake. By way of example, but not limitation, the material 204, 214, 224, 226 can be or include one or more silicone elastomers. The silicone elastomer can swell/change in level of thickness in response to a temperature change. For example, a temperature change can be induced electrically through heating elements included within or controlled by control components 206, 216, 228. The control components 206, 216, 228 can control the heating elements to output a predefined amount of heat. The silicone elastomer can swell in response to the temperature change resultant from the output of heat from the heating elements. Similarly, the silicone elastomer can contract in response to temperature change resultant from the lack of heat output from the heating elements.

In other aspects, any number of other different types of materials that swell or contract in response to water uptake or temperature change can be employed for actuation of the contact lenses described herein.

The control components 206, 216, 228 of FIGS. 2A, 2B and 2C, respectively, can be described in further detail with reference to FIG. 4. In various aspects, one or more of the structure and/or functionality of the control component 206' can be included in the structure and/or functionality of the control components 206, 216, 228 (and vice versa).

Figure 4:
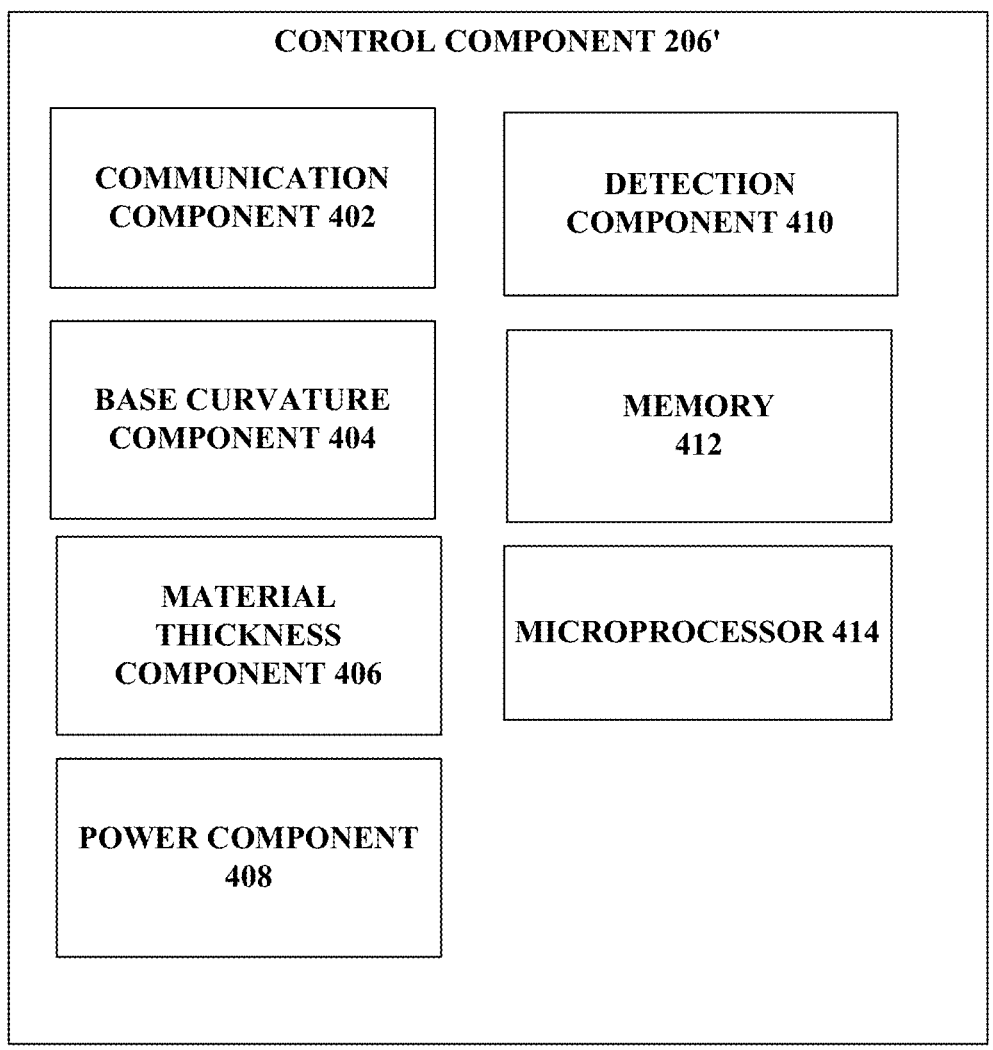
FIG. 4 is an illustration of a block diagram of an exemplary non-limiting control component that facilitates actuatable contact lenses in accordance with aspects described herein.

FIG. 4 is an illustration of a block diagram of an exemplary non-limiting control component that facilitates actuatable contact lenses in accordance with aspects described herein. In some aspects, the control component 206' can include a communication component 402, base curvature component 404, material thickness component 406, power component 408, detection component 410, memory 412 and/or microprocessor 414. In various aspects, one or more of the communication component 402, base curvature component 404, material thickness component 406, power component 408, detection component 410, memory 412 and/or microprocessor 414 can be electrically and/or communicatively coupled to one another to perform one or more functions of the control component 206'.

In various aspects, the control component 206' can output information adapted to actuate the control lens. In some aspects, the information output can be based on information received from a source outside of the contact lens. The source can be sensed (e.g., environment changes) and/or can transmit the information to the control component 206' (e.g., optometrist office transmitting new prescription information for the wearer of the contact lens, prescription information component 106 of FIG. 1). Accordingly, the contact lens can be actuated in real-time, based on static and/or based on dynamic information.

The communication component 402 can transmit information to the material. In some aspects, the information transmitted can be a voltage, an electric field and/or temperature associated with a particular base curvature and/or thickness of the material.

For example, with regard to the output of an electric field, in some embodiments, the communication component 402 can transmit an electric field to the material. The electric field can affect a change in a hydration level of the material thereby changing the thickness of the material. By way of example, but not limitation, the communication component 402 can transmit an electric field to a material such as hydrogel. Via electrowetting (or similar methods), the hydrophobicity of the hydrogel can change from a first level to a second level, thereby changing the hydration level (and thickness) of the hydrogel.

In some aspects, the communication component 402 can transmit and/or receive to and/or from a location remote from the contact lens. For example, information associated with a particular base curvature and/or thickness to which the contact lens should be actuated can be transmitted and/or received. As another example, information including, but not limited to, environment conditions (e.g., time, night, day) can be received by the communication component 402 for actuation of the contact lens to a corresponding base curvature and/or thickness.

In some aspects, the communication component 402 can receive an audio command associated with a particular base curvature and/or thickness and actuate the contact lens accordingly. Accordingly, actuation of the contact lens can be audio-driven in various aspects.

The base curvature component 404 can determine a base curvature to which the contact lens should be actuated. The base curvature determined by the base curvature component 404 can correspond to a condition detected (e.g., by the detection component 410) and/or based on information received by the communication component 402, in various aspects.

In various aspects, the base curvature component 404 can determine the base curvature based on one or more values for base curvature and corresponding features. For example, a table or array of the one or more values and/or corresponding features can be stored in the memory 414 of the control component 206' in some aspects. As another example, the base curvature component 404 can determine the base curvature dynamically based on the features detected by the detection component 410 and one or more methods for determining base curvature stored in or accessible by the base curvature component 404.

The material thickness component 406 can determine a thickness to which the contact lens should be actuated. The thickness determined by the material thickness component 406 can correspond to a condition detected (e.g., by the detection component 410) and/or based on information received by the communication component 402, in various aspects.

In various aspects, the material thickness component 406 can determine the material thickness based on one or more values for material thickness and corresponding features detected by the detection component 410. For example, a table or array including the one or more values and/or corresponding features can be stored in the memory 414 of the control component 206' in some aspects. As another example, the material thickness component 406 can determine the material thickness dynamically based on the features detected by the detection component 410 and one or more methods for determining thickness stored in or accessible by the material thickness component 406.

The power component 408 can be configured to provide a current to the material for actuating the material. In various aspects, the power component 408 can be or include a small battery. In some aspects, the power component 408 can be or include photovoltaic cells and/or an antenna. In various aspects, the power component 408 can include any structure for performing radio frequency (RF) harvesting.

The power component 408 can provide a current or voltage associated with the base curvature and/or thickness determined by the base curvature component 404 and/or the material thickness component 406, respectively. For example, in aspects, wherein the material is a piezoelectric film actuated by a particular voltage differential, the power component 408 can receive a designated base curvature and/or thickness from the base curvature component 404 and/or the material thickness component 406 and generate a corresponding voltage that is applied to the material. The voltage can be based on the type of the piezoelectric film in some aspects. In aspects, wherein the contact lens includes only shape memory alloys, the power component 408 need not apply a voltage to affect the base curvature and/or material thickness desired. Rather, the power component 408 can generate heat to cause a change in temperature at the material and corresponding actuation. In aspects, wherein the contact lens includes only hydrogel, the power component 408 may not provide a voltage or temperature to affect the material thickness desired. Rather, the power component 408 can generate an electric field to cause a change in hydrophobicity of the material and corresponding actuation.

In some aspects, the power component 408 can include one or more heating elements (not shown). In some aspects, power can be provided to the one or more heating elements to cause the heating elements to generate and output heat to cause a change a change in temperature at the material and corresponding actuation. For example, in aspects wherein the material is a silicone elastomer, the one or more heating elements can generate and output heat to cause a change in temperature resulting in swelling of the material. The one or more heating elements can similarly cease to generate and output heat thereby resulting in the silicone elastomer contracting (relative to a swelled state).

The memory 412 can be a computer-readable storage medium storing computer-executable instructions and/or information for performing the functions described in this disclosure with reference to the control component 206'. The microprocessor 414 can perform one or more of the functions described in this disclosure with reference to the control component 206' (or components thereof).

The detection component 410 can detect one or more features that can be associated with a particular desired base curvature and/or thickness of the contact lens. The detection component 410 will be described in greater detail with reference to detection component 410' of FIG. 5. One or more of the structure and/or functionality of detection component 410 can be as described with reference to the detection component 410' (and vice versa).

Figure 5:
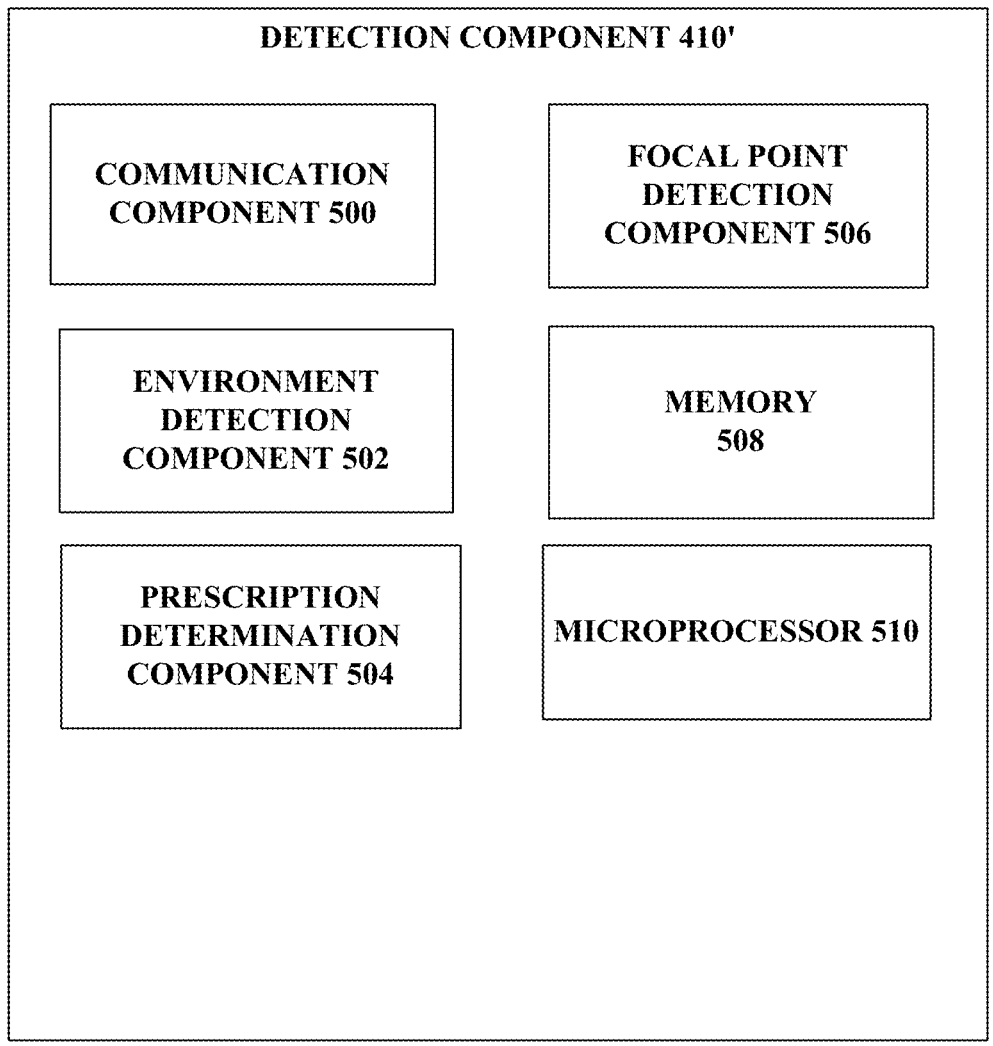
FIG. 5 is an illustration of a block diagram of an exemplary non-limiting detection component that facilitates actuatable contact lenses in accordance with aspects described herein.

Turning to FIG. 5, the detection component 410' can include a communication component 500, an environment detection component 502, a prescription determination component 504, a focal point detection component 506, a memory and/or a microprocessor 510. In one or more aspects, one or more of the communication component 500, environment detection component 502, prescription determination component 504, focal point detection component 506, memory and/or microprocessor 510 can be electrically and/or communicatively coupled to one another to perform one or more functions of the detection component 410'.

The communication component 500 can transmit and/or receive stored and/or detected information to or from the control component 206'. For example, the information can include, but is not limited, information about the environment surrounding the contact lens, information about the prescription for an eye over which the contact lens is placed and/or information about an image in a focal point of the eye.

In some aspects, the base curvature component 404 and/or the material thickness component 406 can receive such information from the detection component 410' and determine a respective base curvature and/or material thickness 406 to which the contact lens should be actuated.

The environment detection component 502 can detect the environment surrounding the contact lens. In various aspects, the environment can be a time of day (e.g., nighttime, daytime, time), a weather condition (e.g., sunny, foggy) or the like. For example, the base curvature and/or thickness can be adjusted to address night vision difficulties in some aspects, in response to detection of a nighttime environmental condition. As an example, the contact lens can be actuated to adjust the base curvature and/or thickness when a nighttime environmental condition is detected.

The prescription determination component 504 can determine the prescription for the eye in which the contact lens is placed. For example, if a contact lens designated for a left eye is placed in the right eye, the prescription determination component 504 can determine the prescription for the right eye and determine information for adjusting the contact lens base curvature and/or thickness to the prescription for the right eye. In various aspects, the prescription determination component 504 can update the prescription of the contact lens based on information received at the control component 206' from a third-party source (e.g., optometrist office, prescription information component 106), based on a level of persistent blurriness detected via the focal point detection component 506 as described below and/or based on a signal received at the prescription determination component 504 from a nearby device, e.g., a mobile device in which the user enters his/her prescription.

In some aspects, an actuated contact lens can adjust base curvature and/or thickness to adjust for astigmatism. For example, the contact lens can alter the shape of the contact lens on one side more than on the other side.

In some aspects, to improve hyperopia in the wearer of the contact lens, the focal point detection component 506 can adjust the base curvature and/or thickness based on a determination of whether a focal point of a wearer of the contact lens is near or far from the contact lens. Similarly, in some aspects, if the focal point is a book that is in close-range, information can be output for adjustment of the base curvature and/or thickness to improve myopia.

For example, the focal point detection component 506 can adjust the base curvature and/or thickness to cause a change in lens shape (e.g., flattening of the lens due to relaxation of the ciliary muscles for a certain amount of time as an indicator that the user is attempting to focus far, and thickening of lens due to contraction of the ciliary muscle for a certain amount of time as an indicator that the user is attempting to focus near).

Accordingly, aspects described herein can reduce the need for bifocals and/or augment failing muscles in the eye that change the focal length of the lens in the eye. For example, the contact lens can assist the eye during accommodation. Further, in various aspects, the information can be updated and/or output in real-time as determined by the conditions experienced by the wearer of the contact lens.

The memory 508 can be a computer-readable storage medium storing computer-executable instructions and/or information for performing the functions described in this disclosure with reference to the detection component 410'. The microprocessor 510 can perform one or more of the functions described in this disclosure with reference to the detection component 410' (or components thereof). Memory 508 and memory 412 can be the same memory or parts of the same memory. Microprocessor 510 and microprocessor 414 can be the same microprocessor or parts of the same microprocessor.

Figure 6:
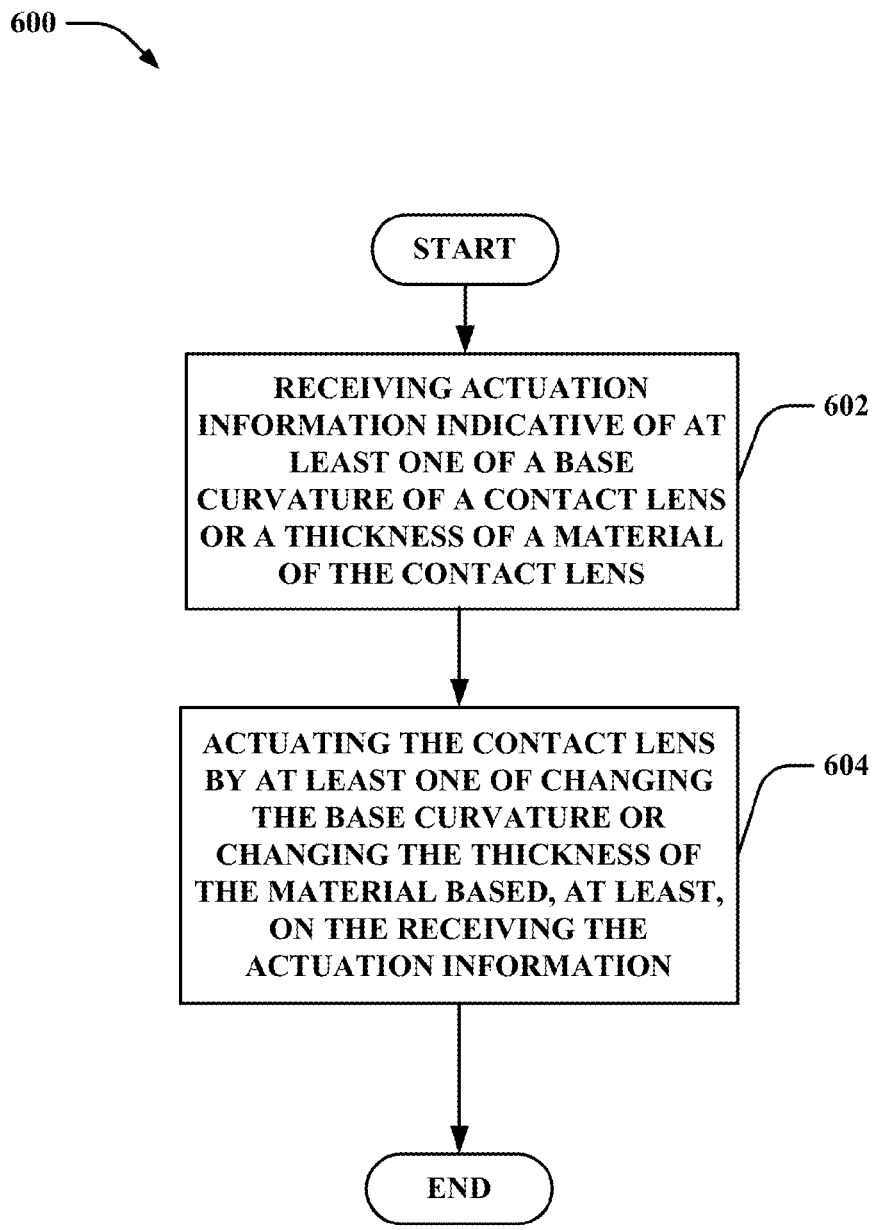
FIGS. 6 and 7 are illustrations of exemplary flow diagrams of methods that facilitate actuating a contact lens in accordance with aspects described herein.
Figure 7:
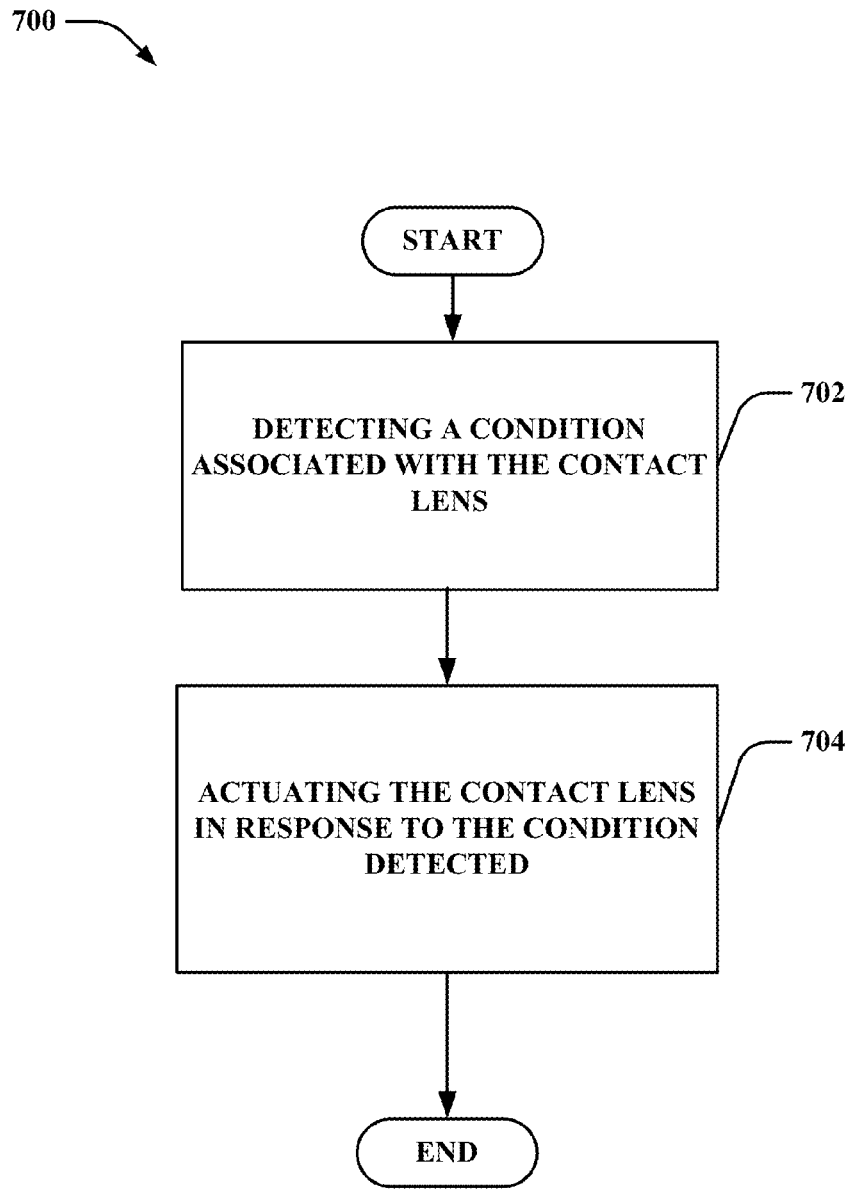

FIG. 6 is an illustration of an exemplary flow diagram of a method that facilitates actuating a contact lens in accordance with aspects described herein. FIG. 7 is an illustration of an exemplary flow diagram of a method that facilitates actuating a contact lens in accordance with aspects described herein.

While method 600 details a first method of actuation of the contact lens, method 700 details a second method of actuation, which is based on detection of one or more conditions.

Turning first to FIG. 6, at 602, method 600 can include receiving actuation information indicative of at least one of a base curvature or a thickness of a material of the contact lens (e.g., using the material 204). In some aspects, the actuation information received by the material 204 can be a voltage received at the material for causing the material to change base curvature and/or thickness, for example.

In some aspects, actuation information can be based on audio information detected by the control component.

At 604, method 600 can include actuating the contact lens by at least one of changing the base curvature or changing the thickness of the material based, at least, on the receiving the information (e.g., using the control component 206'). In some aspects, actuating the contact lens can be performed dynamically.

In some aspects, actuating the contact lens can include providing an amount of voltage or temperature to adjust the base curvature or the thickness of the substrate. For example, for aspects wherein the material 204 is a piezoelectric film, a control component can apply an amount of voltage to the piezoelectric film, causing the piezoelectric film to change base curvature from a first curvature to a second curvature and/or to change thickness from a first thickness to a second thickness. The amount of change in curvature and/or thickness can be based on the type of piezoelectric film and the response of such film to a particular voltage.

FIG. 7 is an illustration of an exemplary flow diagram of a method that facilitates actuating a contact lens in accordance with aspects described herein.

At 702, method 700 can include detecting a condition associated with the contact lens (e.g., using the detection component 410).

In some aspects, detecting the condition can include receiving data indicating one or more different conditions associated with an environment surrounding the contact lens, receiving data indicating a prescription for an eye over which the contact lens is placed and/or receiving data indicating a desired focal point (e.g., at a desired working distance) of the eye.

In some aspects, the condition can include a particular environment (e.g., night, day) surrounding the contact lens. The environment can be detected by the environment detection component 502 of the detection component 410' in some aspects.

In some aspects, the conditions can include a sensed prescription for an eye over which the contact lens is placed. For example, when a contact lens is inserted, the contact lens can detect a prescription associated with the eye in which the contact lens is inserted and actuate the contact lens to a particular base curvature and/or thickness based on the prescription for the eye. The prescription can be detected by the prescription determination component 504 of the detection component 410' in some aspects.

In some aspects, the condition can be the distance between the contact lens and the focal point of an eye over which the contact lens is placed. For example, the focal point of the contact lens can be far from the contact lens, and the contact lens can then actuate to a base curvature and/or thickness to correct myopia. To the contrary, the focal point can be near the contact lens and the contact lens can actuate to a base curvature and/or thickness for hyperopia. The distance between the focal point of the contact lens and the contact lens can be detected by the focal point detection component 506 of the detection component 410' in some aspects.

At 704, method 700 can include actuating the contact lens in response to the condition detected (e.g., using the control component).

In some aspects, although not shown, the methods described herein can include detecting an audio command associated with at least one of a base curvature or a thickness of the contact lens (e.g., using the communication component 502 of the detection component 410'). Actuating the contact lens can be in response to the detection of the audio command (e.g., using the control component 206').

Exemplary Networked and Distributed Environments

One of ordinary skill in the art can appreciate that the various aspects described in this disclosure can be implemented in connection with any computer or other client or server device, which can be deployed as part of a computer network or in a distributed computing environment, and can be connected to any kind of data store where vision prescription information may be found. For example, the control component described herein can be communicatively coupled to a computer or other client or server device that stores prescription information. In this regard, the various aspects described in this disclosure can be implemented in association with any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services can also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the various aspects of this disclosure.

Figure 8:
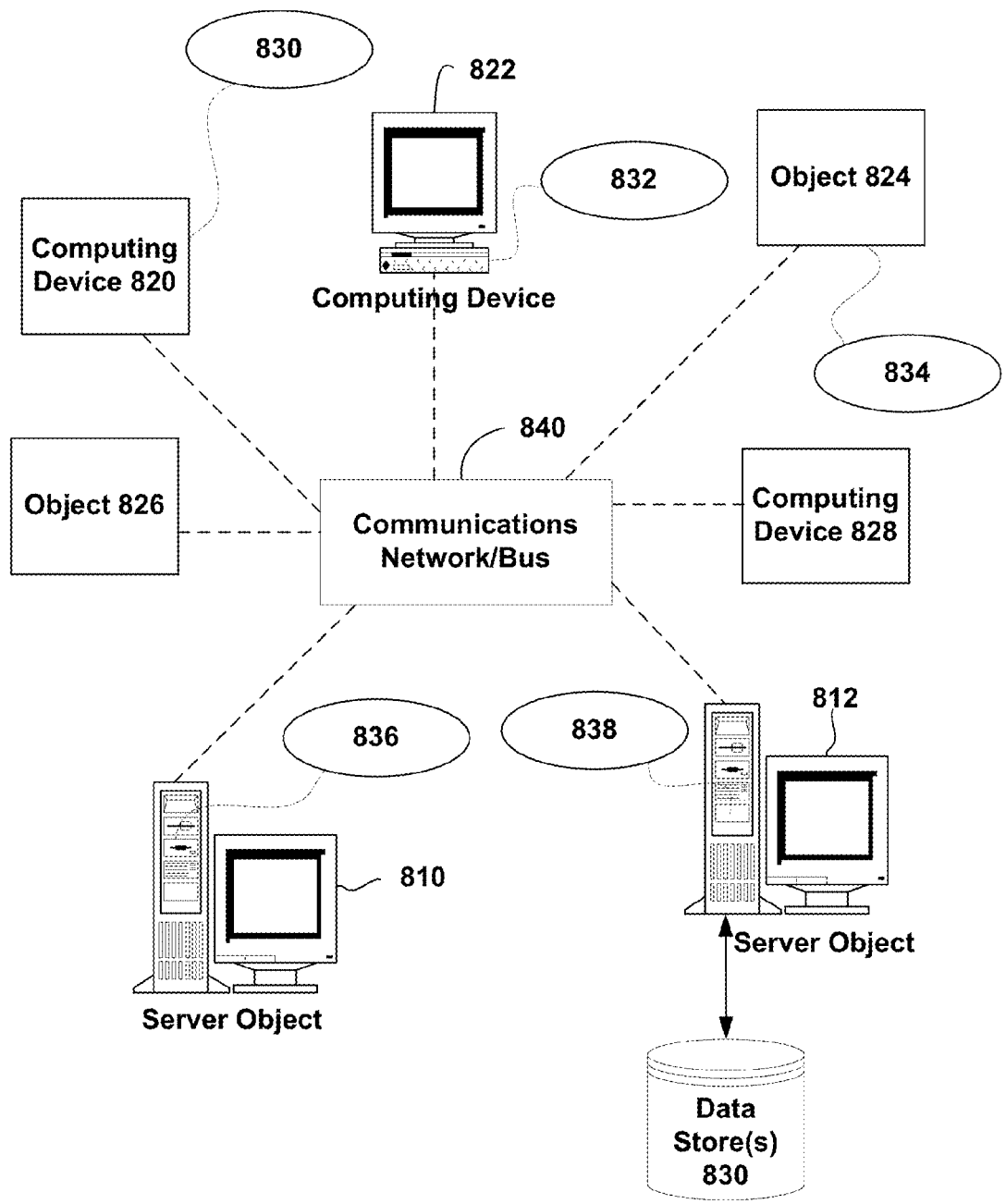
FIG. 8 is an illustration of a schematic diagram of an exemplary networked or distributed computing environment with which one or more aspects described herein can be associated.

FIG. 8 provides a schematic diagram of an exemplary networked or distributed computing environment with which one or more aspects described in this disclosure can be associated. The distributed computing environment includes computing objects 810, 812, etc. and computing objects or devices 820, 822, 824, 826, 828, etc., which can include programs, methods, data stores, programmable logic, etc., as represented by applications 830, 832, 834, 836, 838. It can be appreciated that computing objects 810, 812, etc. and computing objects or devices 820, 822, 824, 826, 828, etc. can include different devices, such as personal digital assistants (PDAs), audio/video devices, mobile phones, MPEG-1 Audio Layer 3 (MP3) players, personal computers, laptops, tablets, devices worn on the body (e.g., on the wrist or head), etc.

Each computing object 810, 812, etc. and computing objects or devices 820, 822, 824, 826, 828, etc. can communicate with one or more other computing objects 810, 812, etc. and computing objects or devices 820, 822, 824, 826, 828, etc. by way of the communications network 840, either directly or indirectly. Even though illustrated as a single element in FIG. 8, network 840 can include other computing objects and computing devices that provide services to the system of FIG. 8, and/or can represent multiple interconnected networks, which are not shown. Each computing object 810, 812, etc. or computing objects or devices 820, 822, 824, 826, 828, etc. can also contain an application, such as applications 830, 832, 834, 836, 838, that might make use of an application programming interface (API), or other object, software, firmware and/or hardware, suitable for communication with or aspect of the various aspects of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the systems as described in various aspects.

Thus, a host of network topologies and network infrastructures, such as client/server, peer-to-peer, or hybrid architectures, can be utilized. The client can be a member of a class or group that uses the services of another class or group. A client can be a computer process, e.g., roughly a set of instructions or tasks, that requests a service provided by another program or process. A client can utilize the requested service without having to know all working details about the other program or the service itself.

As used in this application, the terms "component," "component," "system," and the like are intended to refer to a computer-related entity, either hardware, software, firmware, a combination of hardware and software, software and/or software in execution. For example, a component can be, but is not limited to being, a process running on a processor, a processor, an object, an executable, a thread of execution, a program, and/or a computer. By way of illustration, both an application running on a computing device and/or the computing device can be a component. One or more components can reside within a process and/or thread of execution and a component can be localized on one computer and/or distributed between two or more computers. In addition, these components can execute from various computer-readable storage media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

In a client/server architecture, particularly a networked system, a client can be a computer that accesses shared network resources provided by another computer, e.g., a server. In the illustration of FIG. 8, as a non-limiting example, computing objects or devices 820, 822, 824, 826, 828, etc. can be thought of as clients and computing objects 810, 812, etc. can be thought of as servers where computing objects 810, 812, etc. provide data services, such as receiving data from client computing objects or devices 820, 822, 824, 826, 828, etc., storing of data, processing of data, transmitting data to client computing objects or devices 820, 822, 824, 826, 828, etc., although any computer can be considered a client, a server, or both, depending on the circumstances. Any of these computing devices can process data, or request transaction services or tasks that can implicate the techniques for systems as described in this disclosure for one or more aspects.

A server can be typically a remote computer system accessible over a remote or local network, such as the Internet or wireless network infrastructures. The client process can be active in a first computer system, and the server process can be active in a second computer system, communicating with one another over a communications medium, thus providing distributed functionality and allowing multiple clients to take advantage of the information-gathering capabilities of the server. Any software objects utilized pursuant to the techniques described in this disclosure can be provided standalone, or distributed across multiple computing devices or objects.

In a network environment in which the communications network/bus 840 can be the Internet, for example, the computing objects 810, 812, etc. can be Web servers, file servers, media servers, etc. with which the client computing objects or devices 820, 822, 824, 826, 828, etc. communicate via any of a number of known protocols, such as the secure hypertext transfer protocol (SHTTP). Objects 810, 812, etc. can also serve as client computing objects or devices 820, 822, 824, 826, 828, etc., as can be characteristic of a distributed computing environment.

Exemplary Computing Device

As mentioned, advantageously, the techniques described in this disclosure can be associated with any suitable device. It is to be understood, therefore, that handheld, portable and other computing devices and computing objects of all kinds are contemplated for use in connection with the various aspects, i.e., anywhere that a device may wish to read or write transactions from or to a data store. Accordingly, the below remote computer described below in FIG. 9 is but one example of a computing device.

Although not required, aspects can be partly implemented via an operating system, for use by a developer of services for a device or object, and/or included within application software that operates to perform one or more functional aspects of the various aspects described in this disclosure. Software can be described in the general context of computer executable instructions, such as program components, being executed by one or more computers, such as client workstations, servers or other devices. Those skilled in the art will appreciate that computer systems have a variety of configurations and protocols that can be used to communicate data, and thus, no particular configuration or protocol is to be considered limiting.

Figure 9:
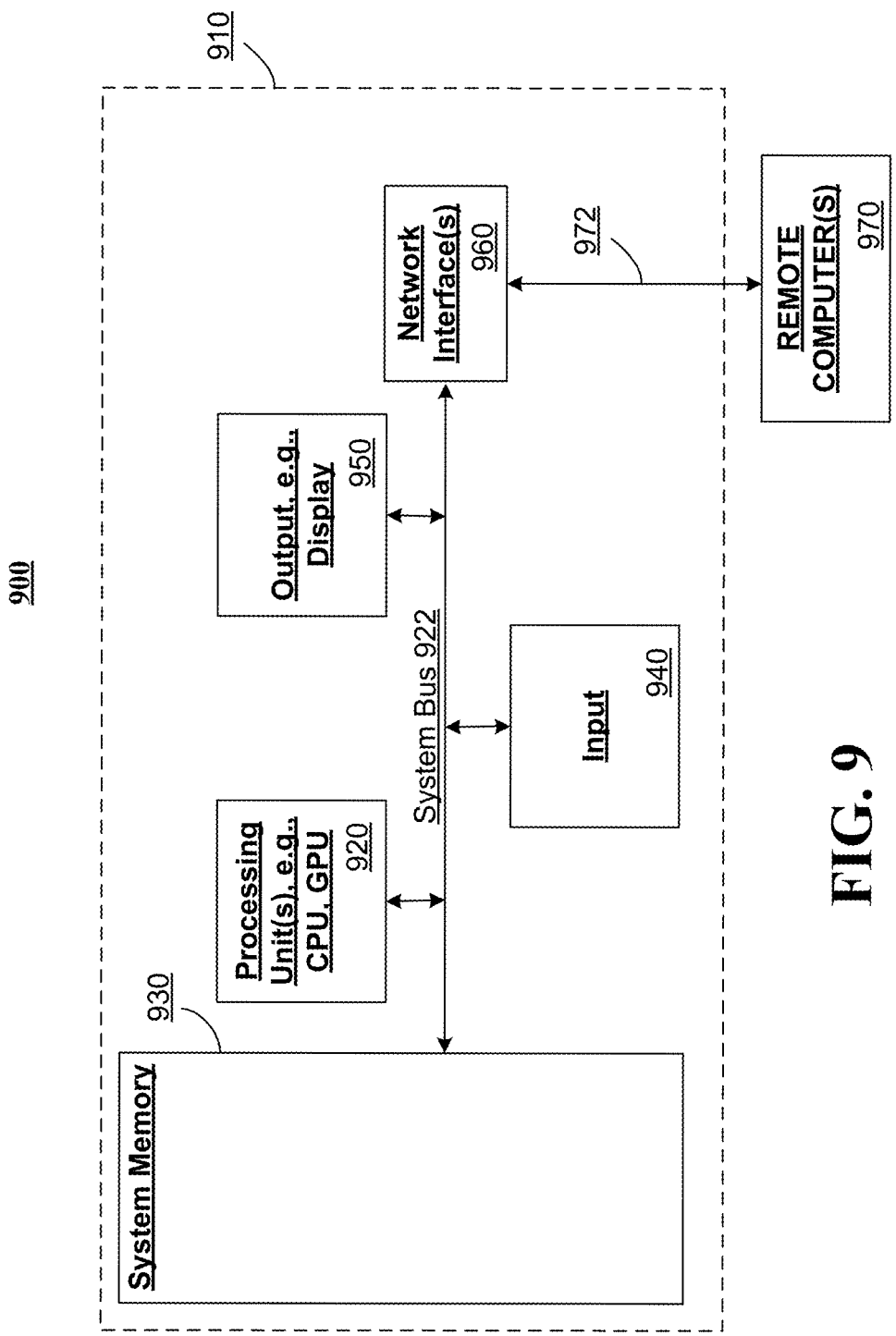
FIG. 9 is an illustration of a schematic diagram of an exemplary computing environment with which one or more aspects described herein can be associated.

FIG. 9 thus illustrates an example of a suitable computing system environment 900 in which one or aspects of the aspects described in this disclosure can be implemented, although as made clear above, the computing system environment 900 is only one example of a suitable computing environment and is not intended to suggest any limitation as to scope of use or functionality. Neither is the computing environment 900 to be interpreted as having any dependency or requirement relating to any one or combination of components illustrated in the exemplary computing environment 900.

With reference to FIG. 9, an exemplary computing environment 900 for implementing one or more aspects includes a computing device in the form of a computer 910 is provided. Components of computer 910 can include, but are not limited to, a processing unit 920, a system memory 930, and a system bus 922 that couples various system components including the system memory to the processing unit 920.

Computer 910 typically includes a variety of computer readable media and can be any available media that can be accessed by computer 910. The system memory 930 can include computer storage media in the form of volatile and/or nonvolatile memory such as read only memory (ROM) and/or random access memory (RAM). By way of example, and not limitation, memory 930 can also include an operating system, application programs, other program components, and program data.

A user can enter commands and information into the computer 910 through input devices 940, non-limiting examples of which can include a keyboard, keypad, a pointing device, a mouse, stylus, touchpad, touch screen, trackball, motion detector, camera, microphone, joystick, game pad, scanner, video camera or any other device that allows the user to interact with the computer 910. A monitor or other type of display device can be also connected to the system bus 922 via an interface, such as output interface 950. In addition to a monitor, computers can also include other peripheral output devices such as speakers and a printer, which can be connected through output interface 950.

The computer 910 can operate in a networked or distributed environment using logical connections to one or more other remote computers, such as remote computer 980. The remote computer 980 can be a personal computer, a server, a router, a network PC, a peer device or other common network node, or any other remote media consumption or transmission device, and can include any or all of the elements described above relative to the computer 910. The logical connections depicted in FIG. 9 include a network 982, such local area network (LAN) or a wide area network (WAN), but can also include other networks/buses e.g., cellular networks.

As mentioned above, while exemplary aspects have been described in connection with various computing devices and network architectures, the underlying concepts can be applied to any network system and any computing device or system in which it is desirable to publish or consume media in a flexible way.

Also, there are multiple ways to implement the same or similar functionality, e.g., an appropriate API, tool kit, driver code, operating system, control, standalone or downloadable software object, etc. which enables applications and services to take advantage of the techniques detailed herein. Thus, aspects herein are contemplated from the standpoint of an API (or other software object), as well as from a software or hardware object that implements one or more aspects described in this disclosure. Thus, various aspects described in this disclosure can have aspects that are wholly in hardware, partly in hardware and partly in software, as well as in software.

Computing devices typically include a variety of media, which can include computer-readable storage media and/or communications media, in which these two terms are used herein differently from one another as follows. Computer-readable storage media can be any available storage media that can be accessed by the computer, can be typically of a non-transitory nature, and can include both volatile and non-volatile media, removable and non-removable media. By way of example, and not limitation, computer-readable storage media can be implemented in connection with any method or technology for storage of information such as computer-readable instructions, program components, structured data, or unstructured data. Computer-readable storage media can include, but are not limited to, RAM, ROM, electrically erasable programmable read only memory (EEPROM), flash memory or other memory technology, compact disc read only memory (CD-ROM), digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program components or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, radio frequency (RF), infrared and other wireless media.

It is to be understood that the aspects described in this disclosure can be implemented in hardware, software, firmware, middleware, microcode, or any combination thereof. For a hardware aspect, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors and/or other electronic units designed to perform the functions described in this disclosure, or a combination thereof.

When the aspects are implemented in software, firmware, middleware or microcode, program code or code segments, they can be stored in a machine-readable medium (or a computer-readable storage medium), such as a storage component. A code segment can represent a procedure, a function, a subprogram, a program, a routine, a subroutine, a component, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software aspect, the techniques described in this disclosure can be implemented with components or components (e.g., procedures, functions, and so on) that perform the functions described in this disclosure. The software codes can be stored in memory units and executed by processors. A memory unit can be implemented within the processor or external to the processor, in which case it can be communicatively coupled to the processor via various structures.

The word "exemplary" is used herein to mean serving as an example, instance, or illustration. For the avoidance of doubt, the subject matter disclosed herein is not limited by such examples. In addition, any aspect or design described in this disclosure as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

What has been described above includes examples of one or more aspects. It is, of course, not possible to describe every conceivable combination of components or methodologies for purposes of describing the aforementioned aspects, but one of ordinary skill in the art can recognize that many further combinations and permutations of various aspects are possible. Accordingly, the described aspects are intended to embrace all such alterations, modifications and variations that fall within the spirit and scope of the appended claims. Moreover, use of the term "an aspect" or "one aspect" throughout is not intended to mean the same aspect unless specifically described as such. Further, use of the term "plurality" can mean two or more.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it is to be noted that one or more components can be combined into a single component providing aggregate functionality or divided into several separate sub-components, and that any one or more middle layers, such as a management layer, can be provided to communicatively couple to such sub-components in order to provide integrated functionality. Any components described in this disclosure can also interact with one or more other components not specifically described in this disclosure but generally known by those of skill in the art.

In view of the exemplary systems described above methodologies that can be implemented in accordance with the described subject matter will be better appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks can occur in different orders and/or concurrently with other blocks from what is depicted and described in this disclosure. Where non-sequential, or branched, flow is illustrated via flowchart, it can be appreciated that various other branches, flow paths, and orders of the blocks, can be implemented which achieve the same or a similar result. Moreover, not all illustrated blocks can be required to implement the methodologies described in this disclosure after.

In addition to the various aspects described in this disclosure, it is to be understood that other similar aspects can be used or modifications and additions can be made to the described aspect(s) for performing the same or equivalent function of the corresponding aspect(s) without deviating there from. Still further, multiple processing chips or multiple devices can share the performance of one or more functions described in this disclosure, and similarly, storage can be provided across a plurality of devices. The invention is not to be limited to any single aspect, but rather can be construed in breadth, spirit and scope in accordance with the appended claims.

What is claimed is:

1. A contact lens, comprising:
a substrate comprised of a material adapted to actuate and change a thickness of the contact lens from a first thickness at a first time to a second thickness at a second time, wherein the material comprises a silicone elastomer, and wherein the material is adapted to actuate based, at least, on a change in temperature of a heating element near the material.

2. The contact lens of claim 1, further comprising:
a controller configured to control the heating element.

3. A contact lens, comprising:
a substrate comprised of a material that is actuatable to at least one of change a base curvature of the contact lens from a first curvature to a second curvature or change a thickness of the contact lens from a first thickness to a second thickness, wherein the material comprises a silicone elastomer, and wherein the material is adapted to actuate based, at least, on a change in temperature of a heating element near the material; and
a control component, operably coupled to the material, that outputs actuation information to cause the material to actuate and at least one of change the base curvature of the contact lens or change the thickness of the contact lens.

4. The contact lens of claim 3, wherein the control component outputs actuation information in real-time.

5. The contact lens of claim 4, wherein the actuation information is output based, at least, on one or more different conditions associated with an environment surrounding the contact lens, an eye over which the contact lens is placed or based on a focal point of the eye over which the contact lens is placed.

6. The contact lens of claim 3, wherein the control component comprises a power source and the actuation information comprises at least one of an amount of voltage or heat, wherein the power source generates the amount of voltage or heat.

7. The contact lens of claim 6, wherein the power source comprises at least one of a battery, a photovoltaic device, or a radio frequency device.

8. The contact lens of claim 3, wherein the control component further comprises an environment detection component that detects a time of day,
wherein the information comprises time of day actuation information, and
wherein the control component outputs first time of day actuation information in response to the environment detection component detecting a first time of day and wherein the control component outputs second time of day actuation information in response to the environment detection component detecting a second time of day.

9. The contact lens of claim 8, wherein the environment detection component detects the first time of day or the second time of day in real-time.

10. The contact lens of claim 3, wherein the control component further comprises a prescription determination component that determines a prescription for the contact lens based, at least, on an evaluation of a condition of an eye over which the contact lens is positioned, and
wherein the control component outputs a signal to at least one of adjust the base curvature or adjust the thickness of the contact lens based, at least, on the prescription.

11. The contact lens of claim 10, wherein the prescription determination component automatically determines the prescription.

12. The contact lens of claim 3, wherein the control component further comprises a focal point detection component that detects a focal point of an eye over which the contact lens is placed, and
wherein the control component outputs a signal to at least one of adjust the base curvature or adjust the thickness of the contact lens based, at least, on the focal point of the eye.

13. A method of actuating a contact lens, comprising:
receiving actuation information indicative of at least one of a base curvature of the contact lens or a thickness of the contact lens; and
actuating the contact lens by at least one of changing the base curvature or changing the thickness of the contact lens based, at least, on the receiving the actuation information, wherein actuating the contact lens comprises actuating a material in the contact lens, wherein the material comprises a silicone elastomer, and wherein the material is adapted to actuate based, at least, on a change in temperature of a heating element near the material.

14. The method of claim 13, further comprising detecting a condition associated with the contact lens, and wherein actuating the contact lens is in response to the detecting the condition associated with the contact lens.

15. The method of claim 14, wherein the condition associated with the contact lens is associated with at least one of an environment surrounding the contact lens, a sensed prescription for an eye over which the contact lens is placed or a focal point of the eye.

16. The method of claim 13, further comprising detecting an audio command associated with at least one of a base curvature or a thickness of the contact lens, and wherein actuating the contact lens is in response to the detecting the audio command.

17. A contact lens, comprising:
a substrate comprised of a material adapted to actuate and change a hydration level of the material from a first hydration level at a first time to a second hydration level at a second time, wherein the contact lens is configured to have a first thickness associated with the first hydration level and a second thickness associated with the second hydration level; and a control component, operably coupled to the material, that generates an electric field to cause the material to actuate and change the hydration level of the material.

18. The contact lens of claim 17, wherein the material comprises hydrogel.

19. The contact lens of claim 18, wherein actuation changes a hydrophobicity of the hydrogel resulting in a change in the hydration level.

20. The contact lens of claim 17, wherein actuation is performed via electrowetting the material.

21. A contact lens, comprising:

a substrate comprised of a material that is actuatable to at least one of change a base curvature of the contact lens from a first curvature to a second curvature or change a thickness of the contact lens from a first thickness to a second thickness, wherein the material comprises a polyvinylidene fluoride piezoelectric film, a shape memory alloy, or a silicone elastomer; and a control component, operably coupled to the material, that outputs actuation information to cause the material to actuate and at least one of change the base curvature of the contact lens or change the thickness of the contact lens, wherein the control component further comprises a prescription determination component that determines a prescription for the contact lens based, at least, on an evaluation of a condition of an eye over which the contact lens is positioned, and wherein the control component outputs a signal to at least one of adjust the base curvature or adjust the thickness of the contact lens based, at least, on the prescription.

22. The contact lens of claim 21, wherein the prescription determination component automatically determines the prescription.

23. The contact lens of claim 21, wherein the material comprises a silicone elastomer.

24. The contact lens of claim 23, wherein the material is adapted to actuate based, at least, on a change in temperature of a heating element near the material.

25. The contact lens of claim 21, wherein the material comprises a polyvinylidene fluoride piezoelectric film.

26. The contact lens of claim 21, wherein the material comprises a shape memory alloy.

27. The contact lens of claim 21, wherein the control component comprises a power source and the actuation information comprises at least one of an amount of voltage or heat, wherein the power source generates the amount of voltage or heat.

28. The contact lens of claim 27, wherein the power source comprises at least one of a battery, a photovoltaic device, or a radio frequency device.

* * * * *